(12) United States Patent
Rival

(10) Patent No.: US 7,789,632 B2
(45) Date of Patent: Sep. 7, 2010

(54) FAST ENCLOSURE PUMPING WITH POWER SAVING

(75) Inventor: Jean-Luc Rival, Villaz (FR)

(73) Assignee: Alcatel, Paris (FR)

( * ) Notice: Subject to any disclaimer, the term of this patent is extended or adjusted under 35 U.S.C. 154(b) by 975 days.

(21) Appl. No.: 11/489,408

(22) Filed: Jul. 20, 2006

(65) Prior Publication Data

US 2007/0020111 A1  Jan. 25, 2007

(30) Foreign Application Priority Data

Jul. 20, 2005   (FR) ................... 05 52250

(51) Int. Cl.
*F04B 41/06* (2006.01)
(52) U.S. Cl. ........................................... 417/2
(58) Field of Classification Search .............. 417/2, 417/44.2, 216, 244, 426
See application file for complete search history.

(56) References Cited

U.S. PATENT DOCUMENTS 2,958,455 A * 11/1960 Steinherz et al. ............... 417/2
4,699,570 A   10/1987 Bohn
5,039,280 A * 8/1991 Saulgeot et al. ............. 417/205
5,165,864 A   11/1992 Burger et al.

FOREIGN PATENT DOCUMENTS

| EP | 0 690 235 A | 1/1996 |
| EP | 1 213 482 A | 6/2002 |
| WO | WO 2005038255 A2 * | 4/2005 |

* cited by examiner

*Primary Examiner*—Devon C Kramer
*Assistant Examiner*—Bryan Lettman
(74) *Attorney, Agent, or Firm*—Carmen Patti Law Group, LLC

(57) ABSTRACT

A method and apparatus for reducing the pressure in an enclosure are provided. The method includes at least one primary pump on the outlet side and one secondary pump on the inlet side connected in series in the flow path of the pumped gases and driven in the same rotation direction by a first electric motor and a second electric motor, respectively, controlled by an electronic control module for modifying the speeds of the two electric motors independently, and includes at least one step, during reducing the pressure in the enclosure, of progressively increasing the rotation speed of the secondary pump in accordance with a rotation speed variation law of the secondary pump and at the same time progressively reducing the rotation speed of the primary pump in accordance with a rotation speed variation law of the primary pump.

17 Claims, 2 Drawing Sheets

FAST ENCLOSURE PUMPING WITH POWER SAVING

CROSS-REFERENCE TO RELATED APPLICATIONS

This application is based on French Patent Application No. 0552250 filed Jul. 20, 2005, the disclosure of which is hereby incorporated by reference thereto in its entirety, and the priority of which is hereby claimed under 35 U.S.C. §119.

BACKGROUND OF THE INVENTION

1. Field of the Invention

The present invention relates to vacuum pumping devices capable of establishing and maintaining an appropriate vacuum in an enclosure.

2. Description of the Prior Art

Establishing a vacuum in an enclosure is standard practice in industrial processes such as semiconductor fabrication, certain fabrication steps having to be executed in a vacuum.

In such processes, semiconductor substrates are placed in a loading chamber (load lock) connected to a vacuum pumping device that reduces the pressure inside the loading chamber to a value satisfactory for then transferring the semiconductor substrates into a process chamber in which the appropriate fabrication vacuum has been established.

Obviously, each time substrates are loaded or unloaded the gas pressure in the loading chamber must be lowered and then raised, in an alternating manner, which implies the frequent intervention of the vacuum pumping device.

Equally obviously, establishing the vacuum in the loading chamber is not instantaneous, and this constitutes a limit on the overall speed of the fabrication process.

The importance of this limit is in direct proportion to the size of the substrate, especially in the fabrication of flat television or display screens, the loading chamber necessarily having a volume appropriate for containing one or more flat screens.

For example, the loading chambers used for the fabrication of flat screens at present have large volumes, of the order of 500 to 1000 liters, which must therefore be pumped as quickly as possible.

The solution currently used for rapidly pumping these large loading chambers is to use large pumps fitted with large motors. As a result, the pumps and the motors are large and costly and have a high power consumption.

In practice, prior art pumping devices generally comprise at least one primary pump at the discharge end of the vacuum line and at least one secondary pump at the suction end of the vacuum line, i.e. at the outlet from the enclosure to be pumped. The primary pump and the secondary pump are connected in series in the flow path of the pumped gases and are driven by two electric motors that are supplied with power to rotate at nominal speed.

Vacuum pumping devices comprising at least one primary pump and one secondary pump connected in series and driven by two electric motors controlled by electronic control means are also known, for example from the document U.S. Pat. No. 4,699,570. The primary pump is driven at constant speed and its power supply can be interrupted at the end of pumping. The secondary pump is driven at a speed that increases regularly as the pressure in the enclosure is reduced, to reduce the power consumption of the pump.

The improvement in power consumption achieved by a device of the above kind is nevertheless insufficient, in particular for frequent pumping of large enclosures, and the invention aims to propose means that further reduce power consumption in order to render the device applicable to the pumping of large chambers.

SUMMARY OF THE INVENTION

To this end, the invention proposes a vacuum pumping device for reducing the pressure in an enclosure, comprising at least one primary pump on the outlet side and one secondary pump on the inlet side connected in series in the flow path of the pumped gases and driven by a first electric motor and a second electric motor, respectively, controlled by an electronic control module for modifying the speeds of the two electric motors, characterized in that the electronic control module comprises speed control means which, during a procedure for reducing the pressure in the enclosure, progressively increase the speed of the secondary pump in accordance with a speed variation law of the secondary pump and progressively reduce the speed of the primary pump in accordance with a speed variation law of the primary pump.

With this kind of arrangement, when the enclosure is at atmospheric pressure, at the start of pumping, the compression that the pumps must achieve is low, and the pumping speed can be prioritized by driving the primary pump at high speed, the power consumption being low, and the power consumption can be further reduced by running the secondary pump at low speed.

As the pressure is reduced, the secondary pump can progressively compress the gas in a pressure zone in which compression does not consume power, and the secondary pump can then generate a high throughput without excessive power consumption. This possibility is exploited by progressively increasing the speed of the secondary pump.

At the same time, because the compression that it must produce is high, the primary pump begins to consume large amounts of power and it is then beneficial to reduce its speed to reduce its power consumption, the throughput of the system being maintained by the increased participation of the secondary pump.

It is possible to find an optimum speed law for each of the pumps that reduces power consumption for each volume, for each pump throughput and for each pumping period.

For example:
the speed variation law of the secondary pump comprises a slowly rising first step followed by a fast rising second step followed by a moderately rising third step,
the speed variation law of the primary pump comprises a high-speed first step followed by a fast falling second step followed by a slowly falling third step.

An arrangement of this kind further increases the power saving.

In an advantageous embodiment, the second step of fast rising speed of the secondary pump is simultaneous with the second step of fast falling speed of the primary pump.

To optimize the pumping speed at the same time, it is advantageous if the speed of the secondary pump increases from a minimum speed to its nominal speed and the speed of the primary pump is initially its nominal speed and at the end of the pressure reduction procedure reaches a reduced speed.

The pumping speed is optimized by choosing a secondary pump with a nominal throughput higher than the nominal throughput of the primary pump and the ratio of their initial speeds is chosen to be close to the ratio of the respective nominal throughputs of the secondary pump and the primary pump. This ratio is advantageously from about 10 to about 15.

To increase the pumping speed without increasing the nominal throughput of the pumps, and therefore their size and their volume, it is advantageous if the speed variation law of the primary pump comprises a high-speed first step during which the speed of the primary pump is temporarily increased above its nominal speed.

For example, said high-speed first step of the primary pump comprises an initial period at a speed close to the nominal speed followed by an overspeed period at a speed higher than the nominal speed.

Generally speaking, the speed variation laws of the primary and secondary pumps are chosen to reduce the overall power consumption.

A further power saving may be obtained in accordance with the invention by providing for, at the end of the procedure for lowering the pressure in the enclosure, the speed control means to reduce the speed of the secondary pump from its nominal speed or higher to its minimum speed and the secondary electric motor to recover in the form of electrical energy the kinetic energy of the secondary pump, that electrical energy being reinjected via the electronic control module into the first electric motor for driving the primary pump.

Other objects, features and advantages of the present invention will emerge from the following description of particular embodiments, given with reference to the appended drawings.

DETAILED DESCRIPTION OF THE PREFERRED EMBODIMENTS

Figure 1:
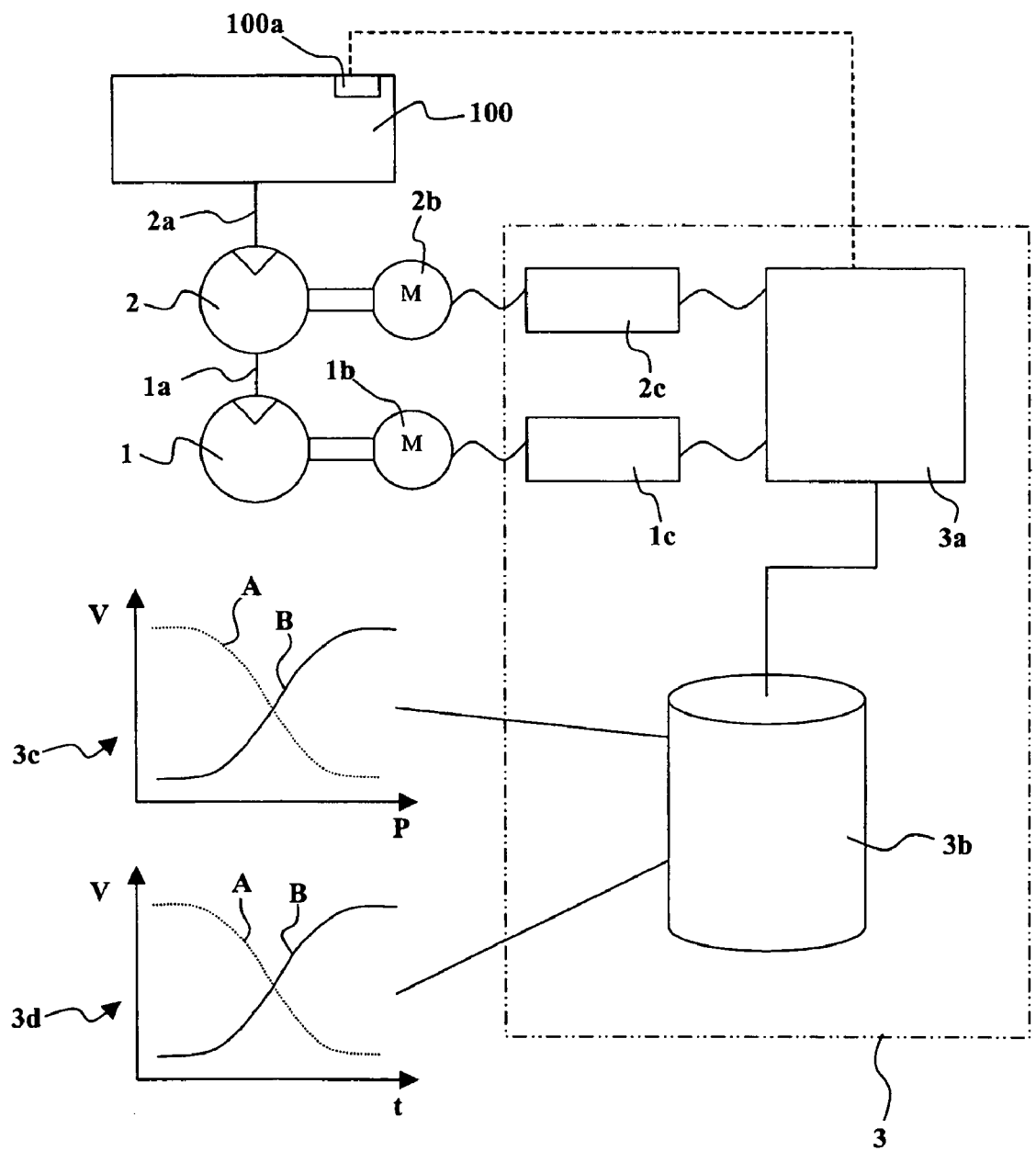
FIG. 1 shows the general structure of one embodiment of a vacuum pumping device of the present invention.

Consider first the device shown in FIG. 1.

It is required to reduce the gas pressure inside an enclosure 100 as quickly as possible and consuming as little power as possible.

A vacuum pumping device of the invention comprising a primary pump 1 and a secondary pump 2 is used for this purpose. The secondary pump 2 has its inlet 2a connected to the enclosure 100 to be pumped and discharges into the inlet 1a of the primary pump 1, which discharges at atmospheric pressure. Thus the pumps 1 and 2 are connected in series in the flow path of the pumped gases.

The primary pump 1 is driven by a first electric motor 1b and the secondary pump 2 is driven by a second electric motor 2b.

The electric motors 1b and 2b are controlled by an electronic control module 3 that controls their respective speeds.

The electronic control module 3 comprises speed control means including a first controlled power supply unit 1c adapted to supply power to the first motor 1b, a second controlled power supply unit 2c adapted to supply power to the second motor 2b, and a processor 3a with an associated memory 3b containing a program for controlling the first and second power supply units 1c and 2c to modify the speeds of the electric motors 1b and 2b.

The program stored in the memory 3b contains pump speed variation laws, for example laws V/P of variation of speed as a function of pressure as shown by curves A and B in diagram 3c or laws V/t of variation of speed as a function of time as shown by curves A and B in diagram 3d.

In a device having variation laws V/t, to reproduce the speed variation laws as shown by curves A and B of diagram 3d, the program is executed as a function of time using the internal clock of the processor 3a and as a function of the data of the program.

In an embodiment using laws V/P of variation of speed as a function of pressure as shown in diagram 3c, the device further includes at least one pressure sensor 100a adapted to sense the pressure in the enclosure 100 and to produce a pressure signal that is sent to the processor 3a. The program can then generate the speed variation laws for the pumps 1 and 2 as a function of the pressure signal, as shown by curves A and B of diagram 3c.

The laws A and B of variation of the speeds of the pumps 1 and 2 reproduced by the programs stored in the memory 3b are chosen beforehand by the user to reduce the overall power consumed by the device to drive the pumps 1 and 2 and thereby establish a vacuum in the enclosure 100.

Figure 2:
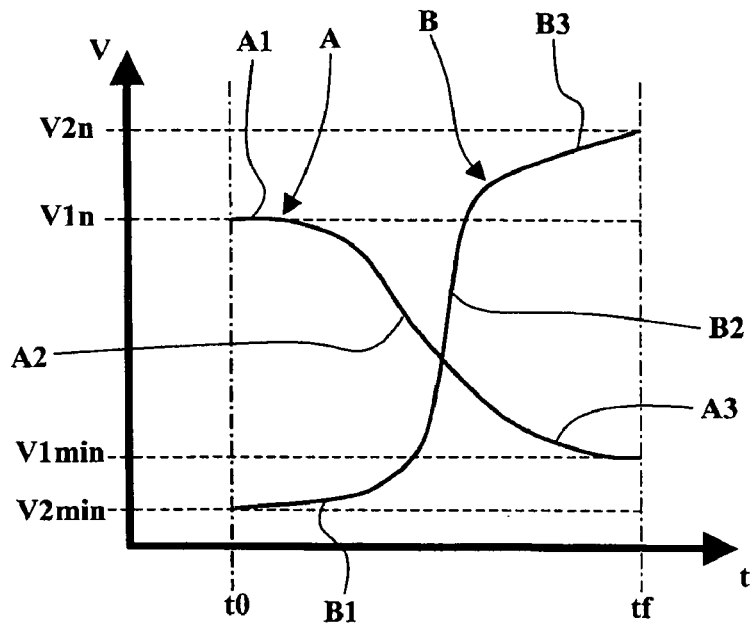
FIG. 2 is a timing diagram showing the primary and secondary pump speed variations in one embodiment of the present invention.
Figure 3:
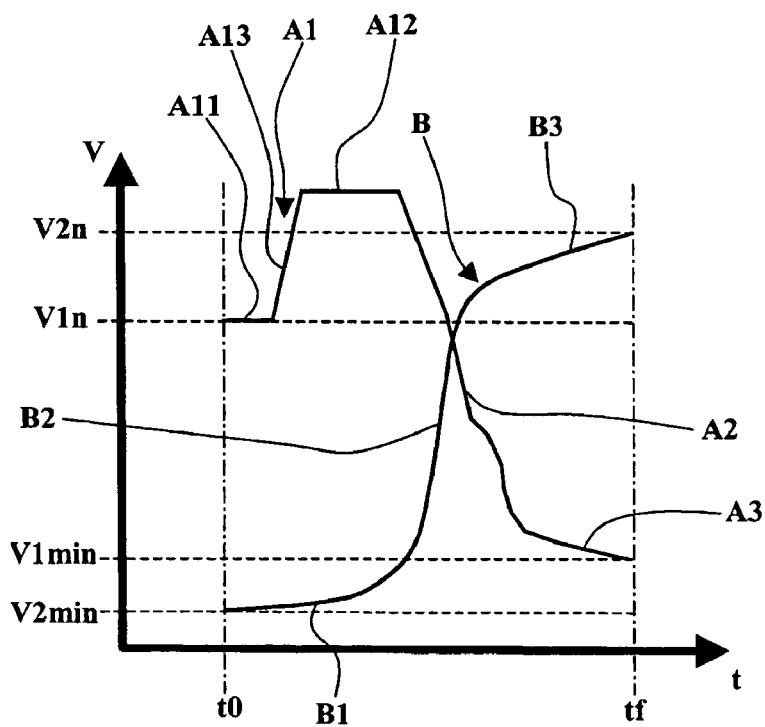
FIG. 3 is a diagram showing the primary and secondary pump speed variations in a second embodiment of the present invention.

Speed variation laws A and B achieving this kind of power saving are shown by way of example in FIGS. 2 and 3.

In the first embodiment, shown in FIG. 2, the curve A is the speed variation law for the primary pump and the curve B is the speed variation law for the secondary pump between an initial time t0 at which the enclosure 100 is at atmospheric pressure and a final time tf at which the required vacuum has been established in the enclosure 100.

Initially, at the time t0, the speed of the primary pump 1 is its nominal speed V1n and the speed of the secondary pump 2 is its minimum speed V2min.

The speed variation law B for the secondary pump 2 comprises a slowly rising first step B1 followed by a fast rising second step B2 followed by a moderately rising third step B3.

The speed variation law A of the primary pump 1 comprises a high-speed first step A1 followed by a fast falling second step A2 followed by a slowly falling third step A3.

At the final time tf, the speed of the secondary pump 2 is equal to its nominal speed V2n and the speed of the primary pump 1 has a reduced value V1min.

The structures of the primary pump 1 and the secondary pump 2 and their initial speeds V1n and V2min can advantageously be chosen in an appropriate manner to optimize throughput and power consumption. To this end, the secondary pump 2 can have a nominal throughput Q2 higher than the nominal throughput Q1 of the primary pump 1. At the same time, the ratio V1n/V2min of the initial speeds is chosen to be close to the ratio K=Q2/Q1 of the respective nominal throughputs of the secondary pump 2 and the primary pump 1.

Efficient power saving can be achieved with a ratio K from about 10 to about 15.

In the embodiment shown in FIG. 2, the high-speed first step A1 of the speed variation law A of the primary pump 1 is a step at a relatively constant speed that is substantially equal to the nominal speed V1n of the primary pump 1.

In the embodiment shown in FIG. 3, the speed variation law A of the primary pump 1 and the speed variation law B of the secondary pump 2 have substantially the same overall shape from the initial time t0 to the final time tf.

The difference is that, in this FIG. 3 embodiment, the speed variation law A of the primary pump 1 comprises a high-speed first step A1 during which the speed of the primary pump 1 is temporarily increased above its nominal speed V1n.

For example, as shown in the FIG. 3 diagram, the high-speed first step A1 of the primary pump 1 comprises an initial period A11 at a speed close to the nominal speed V1n followed by an overspeed period A12 at a speed higher than the nominal speed V1n, the transition between the initial period A11 and the overspeed period A12 occurring over a transient period A13 of relatively short duration.

During the overspeed period A12, the speed of the primary pump 1 may be increased to a speed from 1.5 times to twice the nominal speed, for example. The improvement achieved in terms of pumping speed is significant, and this enables subsequent rapid reduction of the speed of the primary pump during the step A3, which further reduces power consumption.

FIGS. 2 and 3 illustrate embodiments in which the pump speed variation laws are temporal laws, i.e. which give the speed as a function of time. This kind of speed variation law may be suitable if the volume of the enclosure 100 to be pumped is known in advance. In this case, the program generates the speed variation laws A and B of the pumps 1 and 2 as a function of the elapsed time.

In the case of laws of speed variation as a function of pressure, as in diagram 3c in FIG. 1, the pumps can be driven with speed variation laws having the same shape as the laws A and B of FIG. 2 or FIG. 3, the horizontal time axis being replaced by a horizontal pressure axis. This embodiment is preferable if successive enclosures 100 with different volumes have to be pumped by the same pumping device.

Once the vacuum is established in the enclosure 100, to begin a subsequent pumping cycle, it is first necessary to slow the secondary pump 2 to the minimum speed V2min, although it is being driven at its maximum speed, which is greater than or equal to its nominal speed V2n. During this step, the secondary pump 2 is under vacuum, and is therefore not significantly braked by the pumped gases. The secondary pump 2 is rotating at high speed and has a high kinetic energy and would take a very long time to slow down naturally. According to the invention, this kinetic energy can be recovered in the form of electrical energy, and the deceleration period shortened, by controlling the second electric motor 2b in an appropriate manner to brake the second pump 2 and by reinjecting this electrical energy via the electronic control module 3 into the first electric motor 1b for driving the primary pump 1.

The invention applies to pumping devices with two pumps, for example a dry primary pump 1 and a Roots type secondary pump 2.

The motors 1b and 2b can be DC or AC motors, for example.

The invention can be applied to pumping devices in which the pumping line comprises supplementary pumps in series and/or in parallel with the primary pump 1 and the secondary pump 2.

The present invention is not limited to the embodiments explicitly described, and includes variants and generalizations thereof that are obvious to the person skilled in the art.

The invention claimed is:

1. Vacuum pumping method for reducing pressure in an enclosure, at least one primary pump and one secondary pump connected in series in a flow path of pumped gases and driven in same rotation direction by a first electric motor and a second electric motor, respectively, controlled by an electronic control module for modifying speeds of the two electric motors independently, the secondary pump having an inlet side and an outlet side, the inlet side of the secondary pump operatively connected to the enclosure, and the primary pump having an inlet side operatively connected to the outlet side of the secondary pump, comprising:

at least one step, during reducing pressure in the enclosure, of progressively increasing the rotation speed of the secondary pump in accordance with a rotation speed variation law of the secondary pump; and at the same time progressively reducing the rotation speed of the primary pump in accordance with a rotation speed variation law of the primary pump;

the progressively increasing of the rotation speed of the secondary pump being in accordance with a rotation speed variation law of the secondary pump that comprises a slowly rising first step followed by a fast rising second step followed by a moderately rising third step, and the progressively reducing of the rotation speed of the primary pump being in accordance with a rotation speed variation law of the primary pump that comprises a high-speed first step followed by a fast falling second step followed by a slowly falling third step.

2. Method according to claim 1, wherein the second step of fast rising rotation speed of the secondary pump is simultaneous with the second step of fast falling rotation speed of the primary pump.

3. Method according to claim 1, wherein the rotation speed of the secondary pump increases from a minimum rotation speed to its nominal rotation speed and the rotation speed of the primary pump is initially its nominal rotation speed and at the end of the pressure reduction procedure reaches a reduced rotation speed.

4. Method according to claim 3, wherein the secondary pump is selected with a nominal throughput higher than the nominal throughput of the primary pump and the ratio of their initial rotation speeds is chosen to be close to the ratio of the respective nominal throughputs of the secondary pump and the primary pump.

5. Method according to claim 4, wherein the ratio of the respective throughputs of the primary and secondary pumps is from about 10 to about 15.

6. Method according to claim 1, wherein the rotation speed variation law of the primary pump comprises a high-rotation speed first step during which the rotation speed of the primary pump is temporarily increased above its nominal rotation speed.

7. Method according to claim 6, wherein the high-rotation speed first step of the primary pump comprises an initial period at a rotation speed close to the nominal rotation speed followed by an overspeed period at a rotation speed higher than the nominal speed.

8. Method according to claim 1, wherein the rotation speed variation laws of the primary pump and the secondary pump are chosen to reduce the overall power consumption.

9. Method according to claim 1, wherein the rotation speed variation laws of the pumps are generated as a function of pressure.

10. Method according to claim 1, wherein the rotation speed variation laws of the pumps are generated as a function of the elapsed time.

11. Vacuum pumping device for reducing pressure in an enclosure, comprising:

at least one primary pump and one secondary pump connected in series in a flow path of pumped gases and driven by a first electric motor and a second electric motor, respectively, the secondary pump having an inlet side and an outlet side, the inlet side of the secondary pump operatively connected to the enclosure, and the primary pump having an inlet side operatively connected to the outlet side of the secondary pump, an electronic control module that controls the first electric motor and the second electric motor, and modifies speeds of the two electric motors, the electronic control module comprising speed control means comprising a first controlled power supply unit adapted to supply power to the first motor, and a second controlled power supply unit adapted to supply power to the second motor, a processor for controlling the first power supply unit and the second power supply unit to modify the speeds of the electric motors, characterized in that the processor has an associated memory containing a program for controlling the first power supply unit and the second power supply unit in accordance with the rotation speed variation laws of the pumps, and at the end of the procedure for lowering the pressure in the enclosure, the speed control means reduce the rotation speed of the secondary pump from its nominal rotation speed or higher to its minimum rotation speed and kinetic energy of the secondary pump recovered in the form of electrical energy by controlling the second electric motor to brake the second pump, and the electrical energy reinjected via the electronic control module into the first electric motor for driving the primary pump.

12. Device according to claim 11, comprising at least one pressure sensor for sensing the pressure in the enclosure and producing a pressure signal that is sent to the processor, and wherein the program generates the rotation speed variation laws of the pumps as a function of the pressure signal.

13. Device according to claim 11, wherein the program generates the rotation speed variation laws of the pumps as a function of the elapsed time.

14. Vacuum pumping method for reducing pressure in an enclosure, at least one primary pump and one secondary pump connected in series in a flow path of pumped gases and driven in same rotation direction by a first electric motor and a second electric motor, respectively, controlled by an electronic control module for modifying speeds of the two electric motors independently, the secondary pump having an inlet side and an outlet side, the inlet side of the secondary pump operatively connected to the enclosure, and the primary pump having an inlet side operatively connected to the outlet side of the secondary pump, comprising the steps of:

progressively increasing, during reducing pressure in the enclosure, the rotation speed of the secondary pump in accordance with a rotation speed variation law of the secondary pump in which the rotational speed is increased in at least three steps; and at the same time progressively reducing the rotation speed of the primary pump in accordance with a rotation speed variation law of the primary pump in which the rotational speed is reduced in at least three steps;

wherein the rotation speed of the secondary pump is progressively increased in accordance with a rotation speed variation law of the secondary pump that comprises a slowly rising first step followed by a fast rising second step followed by a moderately rising third step; and wherein the rotation speed of the primary pump is progressively reduced in accordance with a rotation speed variation law of the primary pump that comprises a high-speed first step followed by a fast falling second step followed by a slowly falling third step.

15. Method according to claim 14, wherein the second step of fast rising rotation speed of the secondary pump is simultaneous with the second step of fast falling rotation speed of the primary pump.

16. Method according to claim 14, wherein the rotation speed of the secondary pump increases from a minimum rotation speed to its nominal rotation speed and the rotation speed of the primary pump is initially its nominal rotation speed and at the end of the pressure reduction procedure reaches a reduced rotation speed, and wherein the secondary pump is selected with a nominal throughput higher than the nominal throughput of the primary pump and the ratio of their initial rotation speeds is chosen to be close to the ratio of the respective nominal throughputs of the secondary pump and the primary pump.

17. Vacuum pumping method for reducing pressure in an enclosure, at least one primary pump and one secondary pump connected in series in a flow path of pumped gases and driven in same rotation direction by a first electric motor and a second electric motor, respectively, controlled by an electronic control module for modifying speeds of the two electric motors independently, the secondary pump having an inlet side and an outlet side, the inlet side of the secondary pump operatively connected to the enclosure, and the primary pump having an inlet side operatively connected to the outlet side of the secondary pump, comprising the steps of:

progressively increasing, during reducing pressure in the enclosure, the rotation speed of the secondary pump in accordance with a rotation speed variation law of the secondary pump in which the rotational speed is increased in at least three steps; and at the same time progressively reducing the rotation speed of the primary pump in accordance with a rotation speed variation law of the primary pump in which the rotational speed is reduced in at least three steps;

wherein the rotation speed variation law of the primary pump comprises a high-rotation speed first step during which the rotation speed of the primary pump is temporarily increased above its nominal rotation speed, and wherein the high-rotation speed first step of the primary pump comprises an initial period at a rotation speed close to the nominal rotation speed followed by an overspeed period at a rotation speed higher than the nominal speed.

* * * * *